United States Patent [19]
Kinoshita et al.

[11] Patent Number: 5,588,753
[45] Date of Patent: Dec. 31, 1996

[54] DISK DRIVE MOTOR WITH LABYRINTH SEAL

[75] Inventors: Shinji Kinoshita; Mitsuru Ide, both of Nagano, Japan

[73] Assignee: Kabushiki Kaisha Sankyo Seiki Seisakusho, Nagano, Japan

[21] Appl. No.: 518,486

[22] Filed: Aug. 15, 1995

[30] Foreign Application Priority Data

Aug. 17, 1994 [JP] Japan .................... 6-193446

[51] Int. Cl.⁶ .................................................. F16C 33/80
[52] U.S. Cl. .................................. 384/488; 384/480
[58] Field of Search ........................... 384/477, 480, 384/488, 504

[56] References Cited

U.S. PATENT DOCUMENTS

| | | | |
|---|---|---|---|
| 3,109,066 | 1/1962 | Decker | 384/477 |
| 3,978,801 | 9/1976 | Forte | 384/504 X |
| 4,898,480 | 2/1990 | Raj et al. | 384/488 X |

FOREIGN PATENT DOCUMENTS

| | | | |
|---|---|---|---|
| 3805075 | 9/1988 | Germany | 384/477 |

7-111024  4/1995  Japan .

*Primary Examiner*—Thomas R. Hannon
*Attorney, Agent, or Firm*—Sughrue, Mion, Zinn, Macpeak & Seas

[57] ABSTRACT

A disk drive motor having a center shaft, a pair of ball bearings inner rings thereof being fixedly fitted with the center shaft while interposing a predetermined distance therebetween, a hub being supported so as to be rotatable about the center shaft while having outer rings of the ball bearings fixed to an inner hole thereof, a drive magnet integrally rotating the hub, a stator core being arranged so as to confront the drive magnet, and a first seal means and a second seal means being respectively arranged along ways to a space outside the motor to constitute seal mechanisms while communicating the respective ball bearings with the space outside the motor, wherein an annular spacer is fixedly fitted with the center shaft between the inner rings of the pair of ball bearings and an outer circumferential surface of the spacer confronts an inner circumferential surface of the inner hole of the hub while interposing a small gap therebetween, so that a labyrinth seal mechanism is formed.

8 Claims, 3 Drawing Sheets

DISK DRIVE MOTOR WITH LABYRINTH SEAL

BACKGROUND OF THE INVENTION

1. Field of the Invention

The invention relates to a labyrinth mechanism of a motor that is driven to rotate disklike rotating members. For example, the invention is applicable to a motor for driving disklike rotating members such as hard disks and polygon mirrors.

2. Related Art

FIG. 3 shows a conventional example of a disk drive motor. In FIG. 3, a frame 1 has a platelike bracket portion 3 and a center shaft 2 that is formed integrally with the bracket portion at the center of the bracket portion. Inner rings 5a, 6a of upper and lower ball bearings 5, 6 are fixedly fitted with the outer circumference of the center shaft 2. Outer rings 5b, 6b of the ball bearings 5, 6 are also fixedly fitted with an inner hole 13 of a hub 7, so that the hub 7 is supported so as to be rotatable about the center shaft 2.

An annular yoke 9 made of a magnetic material is fixed to a lower portion of the hub 7, and an annular drive magnet 8 is fixed to the inner circumferential surface of the yoke 9. Further, in a lower portion of the center shaft 2 is a core holding portion 4, which is integrally formed with the center shaft 2. A stator core 10 is fixedly fitted with the outer circumference of the core holding portion 4. The stator core 10 has a plurality of salient poles, each of which has a coil 11 wound around. The outer circumferential surface of each salient pole confronts the inner circumferential surface of the drive magnet 8 while interposing an appropriate distance therebetween.

The ball bearings 5, 6 have seal members 5c, 6c to prevent dust produced by the ball bearings 5, 6 from leaking outside the motor and being deposited on such signal reading means as the disk and the magnetic head to affect the functions of the signal reading means while the motor is rotating.

Further, a magnetic fluid seal mechanism serving as a first seal means 14 is not only arranged along the way to a space 19 outside the motor from the upper ball bearing 5 but also arranged so as to bridge between the top of the center shaft 2 and that of the hub 7 as viewed in FIG. 3. The first seal means 14 prevents dust such as oil mist from the ball bearings 5, 6 from scattering into the space 19 outside the motor and thereby depositing on a disk D and the like.

On the other hand, a small gap is provided along the way to the space 19 outside the motor from the lower ball bearing 6. The small gap is also interposed between the inner circumferential surface of the bracket portion 3 of the frame 1 and the outer circumferential surface of the yoke. This small gap constitutes a second seal means 24.

These first seal means 14 and second seal means 24 are known seal means and are provided to prevent the leaking of dust outside the motor, the dust being produced by the ball bearings 5, 6 arranged inside the motor.

The inner hole 13 of the hub 7 has a small diameter portion 17 whose diameter is smaller than the portion of the inner hole 13 which holds the ball bearings 5, 6. The outer rings 5b, 6b of the ball bearings 5, 6 are abutted against the ends of the small diameter portion 17 so that the ball bearings 5, 6 can be positioned at the time of setting the ball bearings 5. It may be noted that a motor using a space ring, which is a separate member, instead of the small diameter portion 17 is also applicable although not shown in the drawings.

A base plate 15 is arranged on the bottom of the bracket portion 3 of the frame 1. A terminal of the coil 11 of each phase wound around the salient poles of the stator core 10 is taken out and connected to this base plate 15. When the coil 11 is energized through conduction to the base plate 15 from an external source, the stator core 10 and the drive magnet 8 repulse from each other to rotate the hub 7 and hence the disk D as a result of the rotation of the hub 7.

The thus constructed disk drive motor uses two ball bearings 5, 6, upper and lower, that rotatably support the hub 7. These ball bearings 5, 6 are arranged so as to be distanced from each other to improve the rigidity of the motor through an improved rotational characteristic. As a result, a space 16 is present between the upper and lower ball bearings 5, 6, the space 16 being surrounded by the inner circumferential surface of the small diameter portion 17 of the hub 7 and the outer circumferential surface of the center shaft 2.

In the thus constructed disk drive motor, the seal members 5c, 6c are arranged for the ball bearings 5, 6, respectively, to prevent dust produced within the respective ball bearings from leaking outside the ball bearings using these seal members 5c, 6c. Further, since the first seal means 14 and the second seal means 24 are provided along the way to the space 19 outside the motor from the ball bearings 5, 6, almost all the dust can be checked from leaking out into the space 19 outside the motor. According to the magnetic fluid seal mechanism such as the seal means 14, in particular, there is no gap which would allow air to pass between the rotating member and the fixed member, which in turn prevents the leaking of dust completely.

However, in the case of forming a seal mechanism by a small gap such as the second seal means 24, the inner space of the motor is not completely closed, allowing fine dust particles to be mixed with the air present in such gap and thereby leaking the dust particles to the outside space 19 through the gap.

Further, in the seal members 5c, 6c arranged on the respective ball bearings 5, 6, tiny gaps allowing the air to pass therethrough are present with respect to the inner rings of the ball bearings. Therefore, dust within the ball bearings may, in some cases, leak out.

Such leakage of dust is encouraged by the flow of air within the motor produced by the rotation of the hub 7. In the case of the conventional disk drive motor as shown in FIG. 3, in particular, the large space 16 is present between the ball bearings 5, 6. This space 16 allows a flow of air to be produced in the entire part of the motor including this space 16 and causes dust produced by the ball bearings 5, 6 to ride on the flow to reach a space 18, thereby disadvantageously allowing the dust to leak out into the outside space 19 through the second seal means 24, although only slightly. The dust that has leaked out into the space 19 outside the motor deposits on the signal reading means such as the disk D and the magnetic head and thereby subjects the disk drive apparatus to inconvenience.

SUMMARY OF THE INVENTION

The invention has been made to eliminate the aforementioned inconvenience. The object of the invention is, therefore, to provide a highly reliable disk drive motor capable of reducing the possibility of leaking dust outside the motor by decreasing a flow of air around the ball bearings while having a space between the ball bearings occupied, the dust being produced by the ball bearings.

There is provided a disk drive motor comprising: a center shaft; a pair of ball bearings, inner rings thereof being fixedly fitted with the center shaft while interposing a predetermined distance therebetween; a hub supported so as to be rotatable about the center shaft with outer rings of the ball bearings being fixed to an inner hole thereof; a drive magnet integrally rotating the hub; a stator core arranged so as to confront the drive magnet; a first seal means and a second seal means, for constituting seal mechanism, respectively, being respectively arranged along ways to a space outside the motor while communicating the respective ball bearings with the space outside the motor; an annular spacer fixedly fitted with the center shaft between the inner rings of the pair of ball bearings, and an outer circumferential surface of the spacer confronts an inner circumferential surface of the inner hole of the hub while interposing a small gap therebetween, so that a labyrinth seal mechanism is formed.

As described in the foregoing, the disk drive motor of the invention is characterized not only as constituting a labyrinth seal structure by fixedly interposing the spacer between the upper and lower ball bearings along the center shaft and forming the small gap between the outer circumferential surface of the spacer and either the inner circumferential surface of the inner hole of the hub or the inner circumferential surface of the small diameter portion arranged on the inner hole of the hub, but also as reducing a flow of air within the motor by causing the spacer to occupy almost all the part of the space between the upper and lower ball bearings. In addition, if the first seal means is constructed as a magnetic fluid seal mechanism, the space including the upper bearing is substantially closed by both the small gap and the magnetic fluid seal mechanism, so that the leaking of dust from the upper bearing can be blocked to a considerable degree. Therefore, the disk drive motor with the spacer can reduce the amount of dust leaked by half or less compared with a disk drive motor without a spacer.

Hence, by reducing the possibility of leaking the dust produced within the ball bearings outside the motor, the inconveniencing of the disk drive apparatus can be prevented.

Further, by setting the small gap to 0.2 mm or less, an improved dust-tightness can be obtained, which in turn contributes to further blocking the dust from leaking out.

Still further, by making the thermal expansion coefficient of the hub equal to that of the spacer, the small gap can be maintained dimensionally constant, which in turn contributes to providing a reliable dust-tightness.

BRIEF DESCRIPTION OF THE DRAWINGS

FIG. 1 (B) is an enlarged view of a portion A in FIG. 1 (A).

DETAILED DESCRIPTION OF THE PREFERRED EMBODIMENTS

Figure 1:
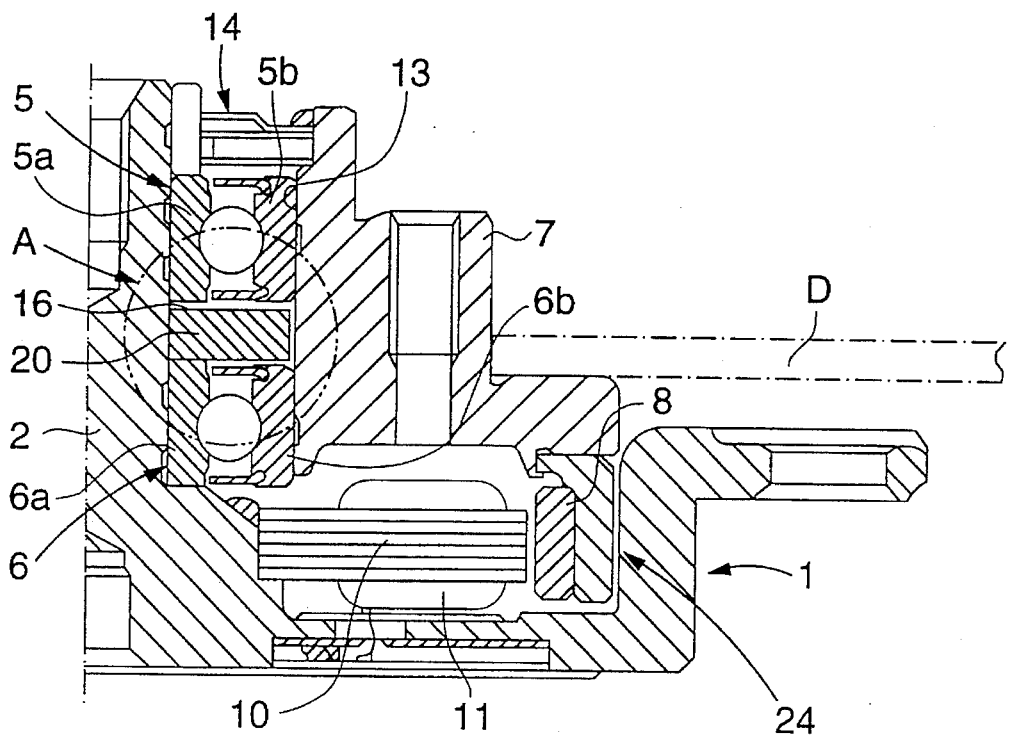
FIG. 1 (A) is a half sectional view of a first embodiment of the present invention.
Figure 1:
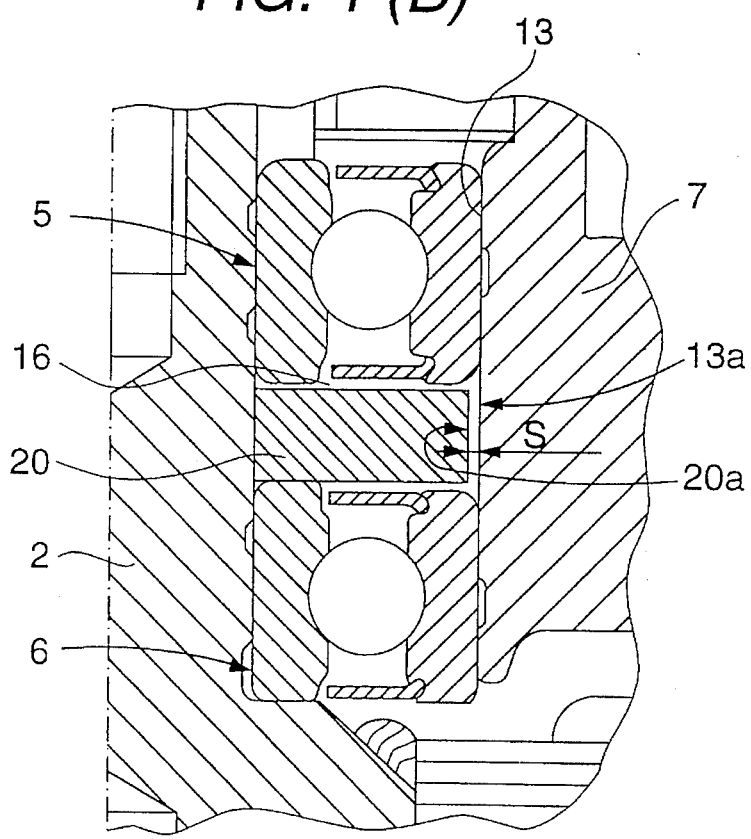
Figure 2:
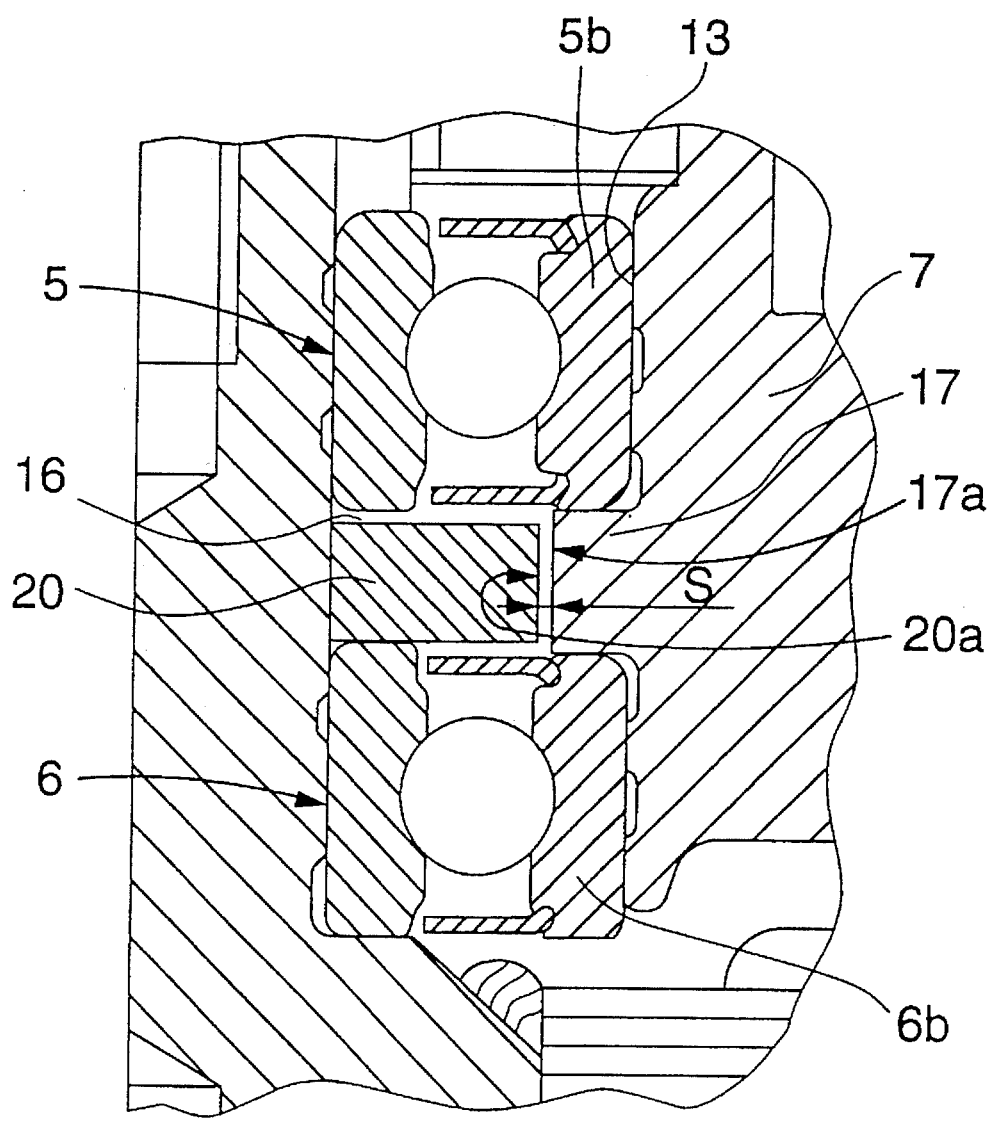
FIG. 2 is a partially enlarged view showing a second embodiment of he invention.

FIGS. 1 and 2 show embodiments of the invention.

FIG. 1 shows a disk drive motor, which is a first embodiment of the invention. FIG. 1 (A) is a half sectional view; and FIG. 1 (B) is a partially enlarged view of a portion (A) of FIG. 1 (A).

Figure 3:
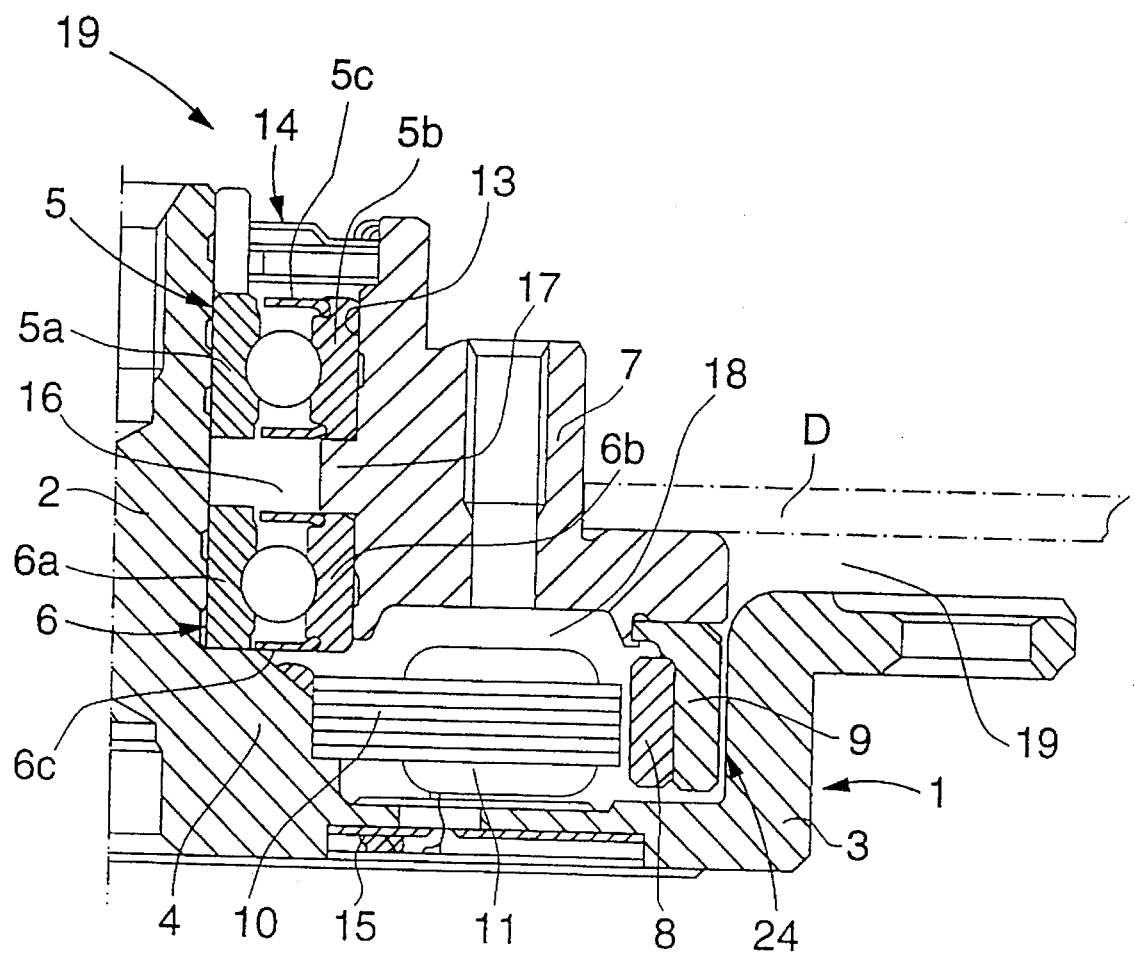
FIG. 3 is a half sectional view showing a conventional disk drive motor.

The same functions and operations as those of the conventional disk drive motor shown in FIG. 3 will be described using the same reference numerals.

The embodiments of the invention will now be described in detail with reference to the drawings.

A disk drive motor of the invention shown in FIG. 1 (A) has a frame 1, a pair of ball bearings 5, 6, a hub 7, a drive magnet 8, a stator core 10, and a first seal means 14 and a second seal means 24. The frame 1 has a center shaft 2. The pair of ball bearings 5, 6 have inner rings 5a, 6a thereof fixedly fitted with the center shaft 2 while interposing a predetermined distance therebetween. The hub 7 is rotatably supported with outer rings 5b, 6b of the ball bearings 5, 6 secured to an inner hole 13 thereof. The drive magnet 8 rotates integrally with the hub 7. The stator core 10 is arranged so as to confront the drive magnet 8. The first seal means 14 and the second seal means 24 constitute seal mechanisms while respectively arranged along the ways to a space 19 outside the motor from the pair of ball bearings 5, 6. The hub 7 is designed to rotate about the center shaft 2 through the ball bearings 5, 6.

To improve the rigidity of the motor, the ball bearings 5, 6 are arranged so as to be distanced from each other. While a space 16 is present in a portion surrounded by the upper and lower ball bearings 5, 6, the inner circumferential surface of the inner hole 13 of the hub 7, and the outer circumferential surface of the center shaft 2, an annular spacer 20 is arranged so as to occupy almost all the part of the space 16. The spacer 20 is fixedly fitted with the center shaft 2 between the inner rings 5a, 6a of the ball bearings 5, 6.

During the fitting operation, the spacer 20 is either biased Onto the end of the inner ring 5a or 6a of the upper or lower ball bearing 5 or 6, or arranged in the middle so as to be abutted against neither of the bearings.

The invention will be described in more detail with reference to the enlarged diagram of the portion A shown in FIG. 1 (B).

The spacer 20 is arranged within the space 16 defined by the upper and lower ball bearings 5, 6, the inner circumferential surface of the inner hole 13 of the hub 7, and the outer circumferential surface of the center shaft 2, and constitutes a labyrinth seal mechanism with an outer circumferential surface 20a of the spacer 20 confronting an inner circumferential surface 13a of the inner hole 13 of the hub 7 while interposing a small gap s therebetween.

As a result of this construction, almost all the part of the space 16 is occupied by the spacer 20. Therefore, the air around the ball bearings within the motor does not flow easily. That is, it is difficult to cause the air coming into and going out of the ball bearings 5, 6 to flow, which in turn prevents the leaking of dust, thereby contributing to reducing the possibility of leaking the dust outside the motor as a whole.

Further, the presence of the small gap s increases the atmospheric pressure in this part while the hub 7 is rotating so that an air flow effect is obtained. Therefore, dust produced by the upper ball bearing 5 does not flow easily into the lower ball bearing 6, and the possibility of leaking the dust outside the motor is reduced by half or less. That is, the leaking of the dust produced by the upper ball bearing 5 can be blocked almost completely, thus making it likely to leak only the dust produced by the lower ball bearing 6 outside the motor.

It may be noted that the leaking of the dust produced by the lower bearing 6 cannot be reduced to zero, although the leaking of the dust produced by the upper bearing 5 can be eliminated almost completely since the space including the upper bearing 5 is substantially closed by the magnetic fluid seal mechanism of the first seal means 14 as well as by the small gap s. To overcome this problem, the second seal means is provided along the way to the outside of the motor to reliably prevent the leaking of dust.

Further, to improve the air flow effect, the small gap s must be minimized. In the first embodiment of the invention, the small gap s between the outer circumferential surface 20a of the spacer 20 and the inner circumferential surface 13a of the inner hole 13 of the hub 7 is set to 0.2 mm or less. When the small gap s exceeds 0.2 mm, dust-tightness is impaired, which in turn increases the amount of dust leaked out.

A second embodiment of the invention shown in FIG. 2 will be described next. FIG. 2 is an enlarged view showing a main portion of a disk drive motor, which is the second embodiment of the invention. It may be noted that in describing the second embodiment the same functions and operations as those of the already described first embodiment will be denoted by the same reference numerals and duplicate descriptions will be omitted.

The second embodiment shown in FIG. 2 is distinguished from the first embodiment in that a small diameter portion 17 is formed on the inner hole 13 of the hub 7. The ends of the outer rings 5b, 6b of the ball bearings 5, 6 are abutted against the corresponding ends of the small diameter portion 17; i.e., the small diameter portion 17 serves to position the ball bearings 5, 6 when the ball bearings are set into the inner hole 13.

By setting the spacer 20 into the space 16 surrounded by the upper and lower ball bearings 5, 6, an inner circumferential surface 17a of the small diameter portion 17 of the hub 7, and the outer circumferential surface of the center shaft 2, the outer circumferential surface 20a of the spacer 20 and the inner circumferential surface 17a of the small diameter portion 17 confront each other while interposing a small gap s therebetween to constitute a labyrinth seal mechanism. It may be noted that this small gap s is also set to 0.2 mm or less.

Therefore, according to the second embodiment, the labyrinth seal mechanism is constructed by the small gap s between the outer circumferential surface 20a of the spacer 20 and the inner circumferential surface 17a of the small diameter portion 17 formed on the inner hole 13 of the hub 7, so that a flow of air within the motor can be controlled by the similar effect described with reference to the first embodiment. In addition, the leaking of dust from the upper bearing 5 can be blocked, which in turn prevents the dust produced within the ball bearings 5, 6 from leaking outside the motor.

A third embodiment of the invention will be described next.

As described with reference to the first and second embodiments, the small gap s formed between the outer circumferential surface 20a of the spacer 20 and either the inner circumferential surface 13a of the inner hole 13 of the hub 7 or the inner circumferential surface 17a of the small diameter portion 17 of the hub 7 is a very small gap. Therefore, if the thermal expansion coefficient of the spacer 20 differs from that of the hub 7, the small gap s changes due to a change in ambient temperature. When the small gap s becomes too large, dust-tightness is impaired, whereas when the small gap s becomes too small, serious rotational losses result due to both members being in contact with each other.

Therefore, it is essential that the small gap s be maintained dimensionally constant under any ambient temperature. To meet this requirement, the third embodiment of the invention is characterized as making the thermal expansion coefficient of the hub 7 equal to the thermal expansion coefficient of the spacer 20.

For example, it is easy to make the thermal expansion coefficients of both members equal to each other by making the hub 7 and the spacer 20 of aluminum or stainless steel of the same quality.

It may be noted that the small gap s can be maintained dimensionally constant with an improved degree of accuracy if the center shaft 2 is also made of a material whose thermal expansion coefficient is the same as those of the hub 7 and the spacer 20.

The foregoing describes the invention made by the inventors with reference to the embodiments thereof. The invention is not limited to those disclosed above, but may, of course, be modified in various modes within such a scope as not to depart from the essential part of the invention. For example, while the center shaft 2 and the frame 1 are formed integrally with each other in the aforementioned embodiments, an embodiment in which the center shaft 2 is separated from the frame 1 is, of course, applicable. Moreover, the first seal means and the second seal means may be constructed differently from the seal means disclosed above.

As described in the foregoing, the disk drive motor of the invention is characterized not only as constituting a labyrinth seal structure by fixedly interposing the spacer between the upper and lower ball bearings along the center shaft and forming the small gap between the outer circumferential surface of the spacer and either the inner circumferential surface of the inner hole of the hub or the inner circumferential surface of the small diameter portion arranged on the inner hole of the hub, but also as reducing a flow of air within the motor by causing the spacer to occupy almost all the part of the space between the upper and lower ball bearings. In addition, if the first seal means is constructed as a magnetic fluid seal mechanism, the space including the upper bearing is substantially closed by both the small gap and the magnetic fluid seal mechanism, so that the leaking of dust from the upper bearing can be blocked to a considerable degree. Therefore, the disk drive motor with the spacer can reduce the amount of dust leaked by half or less compared with a disk drive motor without a spacer.

Hence, by reducing the possibility of leaking the dust produced within the ball bearings outside the motor, the inconveniencing of the disk drive apparatus can be prevented.

Further, by setting the small gap to 0.2 mm or less, an improved dust-tightness can be obtained, which in turn contributes to further blocking the dust from leaking out.

Still further, by making the thermal expansion coefficient of the hub equal to that of the spacer, the small gap can be maintained dimensionally constant, which in turn contributes to providing a reliable dust-tightness.

What is claimed is:

1. A disk drive motor comprising:

a center shaft;

ball bearings, inner rings thereof being fixedly fitted with the center shaft while interposing a predetermined distance therebetween;

a hub supported so as to be rotatable about the center shaft with outer rings of the ball bearings being fixed to an inner hole thereof;

a drive magnet secured to the hub;

a stator core arranged so as to confront the drive magnet;

first and second seals arranged along respective paths in the disk drive motor, said paths leading to a space outside the motor, at least one of said paths communicating the ball bearings with the space outside the motor;

an annular spacer fixedly fitted with the center shaft between the inner rings of the pair of ball bearings, wherein an outer circumferential surface of the spacer confronts an inner circumferential surface of the inner hole of the hub while interposing a small gap therebetween, so that a labyrinth seal mechanism is formed.

2. A disk drive motor as claimed in claim 1, wherein a thermal expansion coefficient of the hub is equal to a thermal expansion coefficient of the spacer.

3. A disk drive motor as claimed in claim 1, wherein a small diameter portion is arranged on the inner hole of the hub, and an inner circumferential surface of the small diameter portion confronts the outer circumferential surface of the spacer, so that a labyrinth seal mechanism is formed.

4. A disk drive motor as claimed in claim 3, wherein a thermal expansion coefficient of the hub is equal to a thermal expansion coefficient of the spacer.

5. A disk drive motor as claimed in claim 3, wherein the small gap is set to 0.2 mm or less.

6. A disk drive motor as claimed in claim 5, wherein a thermal expansion coefficient of the hub is equal to a thermal expansion coefficient of the spacer.

7. A disk drive motor as claimed in claim 1, wherein the small gap is set to 0.2 mm or less.

8. A disk drive motor as claimed in claim 7, wherein a thermal expansion coefficient of the hub is equal to a thermal expansion coefficient of the spacer.

* * * * *